(12) United States Patent
Wang et al.

(10) Patent No.: US 12,038,972 B2
(45) Date of Patent: Jul. 16, 2024

(54) METHOD AND SYSTEM FOR PROFILING A REFERENCE IMAGE AND AN OBJECT-OF-INTEREST THEREWITHIN

(71) Applicant: MOTOROLA SOLUTIONS, INC., Chicago, IL (US)

(72) Inventors: Yin Wang, Quincy, MA (US); Euan Brodie, Haddington (GB); Lukasz Osuch, Pszczyna (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 421 days.

(21) Appl. No.: 17/453,654

(22) Filed: Nov. 5, 2021

(65) Prior Publication Data

US 2023/0145362 A1  May 11, 2023

(51) Int. Cl.
G06F 16/783 (2019.01)
G06F 16/732 (2019.01)
G06F 16/75 (2019.01)
G06F 16/78 (2019.01)
G06V 20/52 (2022.01)
G08B 13/196 (2006.01)

(52) U.S. Cl.
CPC ........ *G06F 16/7837* (2019.01); *G06F 16/732* (2019.01); *G06F 16/75* (2019.01); *G06F 16/7867* (2019.01); *G06V 20/52* (2022.01); *G08B 13/19645* (2013.01)

(58) Field of Classification Search
None
See application file for complete search history.

(56) References Cited

U.S. PATENT DOCUMENTS

| 8,988,219 | B2 * | 3/2015 | McCloskey .......... G08B 29/046 340/500 |
| 10,354,159 | B2 | 7/2019 | Savvides et al. |
| 11,031,044 | B1 | 6/2021 | Lee et al. |
| 11,048,930 | B2 | 6/2021 | Doumbouya et al. |

(Continued)

FOREIGN PATENT DOCUMENTS

| CN | 109255043 B | 8/2020 |
| IN | 201741009377 A | 9/2018 |

(Continued)

OTHER PUBLICATIONS

U. Ramachandran et al., "Large-Scale Situation Awareness With Camera Networks and Multimodal Sensing," in Proceedings of the IEEE, vol. 100, No. 4, pp. 878-892, Apr. 2012, doi: 10.1109/JPROC.2011.2182093 (Year: 2012).*

(Continued)

*Primary Examiner* — Vu Le
*Assistant Examiner* — Charles C L Penny

(57) ABSTRACT

A method and system for profiling a reference image and an object-of-interest therewithin is disclosed. The method includes storing semantic metadata that provides semantic information about environments for respective areas covered by respective Fields Of View (FOVs) of video cameras. The method also includes comparing the semantic metadata to additional metadata corresponding to at least one of an object accessory and a non-permanent object facet to identify a subset of the video cameras, less than an entire video camera universe, that meet a similarity score condition.

20 Claims, 5 Drawing Sheets

(56) References Cited

U.S. PATENT DOCUMENTS

| | | | | |
|---|---|---|---|---|
| 2007/0282665 | A1* | 12/2007 | Buehler | G08B 13/19697 |
| | | | | 705/7.29 |
| 2015/0103178 | A1* | 4/2015 | Itoh | G06V 20/41 |
| | | | | 348/159 |
| 2019/0042900 | A1* | 2/2019 | Smith | G06V 10/96 |
| 2021/0158047 | A1 | 5/2021 | Tanner et al. | |
| 2022/0005332 | A1* | 1/2022 | Metzler | G08B 13/19647 |

FOREIGN PATENT DOCUMENTS

| | | |
|---|---|---|
| WO | 2015099669 A1 | 7/2015 |
| WO | 2016106383 A2 | 6/2016 |

OTHER PUBLICATIONS

Z. Shao, J. Cai and Z. Wang, "Smart Monitoring Cameras Driven Intelligent Processing to Big Surveillance Video Data," in IEEE Transactions on Big Data, vol. 4, No. 1, pp. 105-116, Mar. 1, 2018, doi: 10.1109/TBDATA.2017.2715815 (Year: 2018).*

H. Galiyawala, M.S. Raval, Person retrieval in surveillance using textual query: a review. Multimed Tools Appl 80, 27343-27383 (2021). doi.org:10.1007/s11042-021-10983-0 (Year: 2021).*

Marszalek and C. Schmid, "Semantic Hierarchies for Visual Object Recognition," 2007 IEEE Conference on Computer Vision and Pattern Recognition, Minneapolis, MN, USA, 2007, pp. 1-7, doi: 10.1109/CVPR.2007.383272 (Year: 2007).*

K. W. Lee et al. "Wardrobe Model for Long Term Re-identification and Appearance Prediction," 2018 15th IEEE International Conference on Advanced Video and Signal Based Surveillance (AVSS), Auckland, New Zealand, 2018, pp. 1-6, doi: 10.1109/AVSS.2018.8639157 (Year: 2018).*

I. Mehmood, M. Sajjad, W. Ejaz, and S. W. Baik, "Saliency-directed prioritization of visual data in wireless surveillance networks," Information Fusion, vol. 24, pp. 16-30, Jul. 2015. doi: 10.1016/j.inffus.2014.07.002 (Year: 2015).*

J. Cameron, M. E. Kaye, and E. Scheme, "Dynamic prioritization of surveillance video data in real-time Automated Detection Systems," Expert Systems with Applications, vol. 161, p. 113672, Dec. 2020. doi:10.1016/j.eswa.2020.113672 (Year: 2020).*

Xu T, Shen K, Fu Y, Shi H, Lin FX. Clique: Spatiotemporal Object Re-identification at the City Scale. arXiv preprint arXiv:2012.09329. Dec. 17, 2020 (Year: 2020).*

Vella Giuseppe et al: "SURVANT: An Innovative Semantics-Based Surveillance Video Archives Investigation Assistant", Jan. 15, 2021 (Jan. 15, 2021), 16th European Conference—Computer Vision—ECCV 2020, pp. 611-626, XP047577472, the whole document.

The International Search Report and The Written Opinion, corresponding patent application No. PCT/US2022/046846 filed: Oct. 17, 2022 mailed: Jan. 24, 2023, all pages.

* cited by examiner

METHOD AND SYSTEM FOR PROFILING A REFERENCE IMAGE AND AN OBJECT-OF-INTEREST THEREWITHIN

BACKGROUND

Appearance searching is a video-specific example of analytics-powered, similar images searching. Typically, appearance searching involves the deployment and operation of neural networks and other artificial intelligence technology to sort through lengthy amounts of video to quickly locate a specific object of interest. Appearance searching can improve incident response time and enhance forensic investigations by helping users compile robust video evidence, create a powerful narrative of events, and reveal an object's route or last-known location.

To better understand the uses and applications of appearance searching and other types of computer vision technologies, it is helpful also to first understand what an automated security system is: automated security systems typically employ video cameras and/or other image capturing devices or sensors to collect image data such as video. Images represented by the image data may be displayed for contemporaneous screening by security personnel and/or recorded for later review after a security breach. Appearance searching is one example, amongst others, of computer vision technologies that can greatly assist security personnel and others in connection with these sorts of activities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
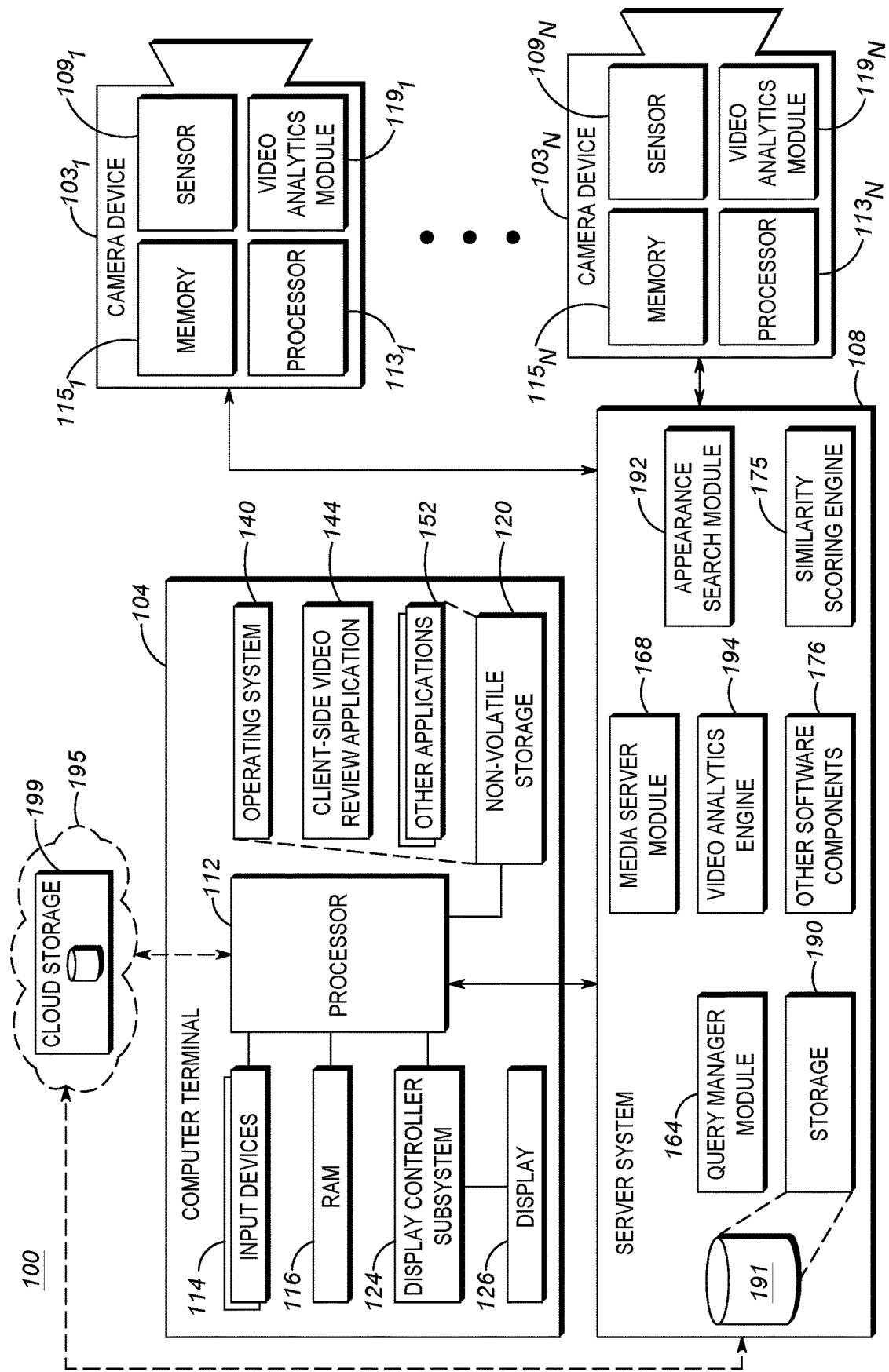
FIG. 1 is a block diagram of a security system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes storing semantic metadata which is in relation to a plurality of video cameras within a video camera universe. The semantic metadata provides semantic information about environments for respective areas covered by respective Fields Of View (FOVs) of the video cameras. The computer-implemented method also includes detecting and recognizing at least one of an object accessory and a non-permanent object facet possessed by an object-of-interest within at least one reference image. The computer-implemented method also includes comparing the semantic metadata to additional metadata corresponding to the at least one of the object accessory and the non-permanent object facet to identify a subset of the video cameras, less than the entire video camera universe, that meet a similarity score condition. The computer-implemented method also includes creating or modifying, after the subset of the video cameras is identified, an analytics criteria or analytics prioritization to be applied to the subset of the video cameras.

In examples of the computer-implemented method, the creating or modifying the analytics criteria or analytics prioritization may include modifying an alert-triggering watchlist applied to the subset of the video cameras.

In accordance with another example embodiment, there is provided a security system that includes a plurality of video cameras belonging to a video camera universe. The system also includes at least one processor communicatively coupled to the video cameras. The at least one processor is configured to store semantic metadata in relation to the video cameras. The semantic metadata provides semantic information about environments for respective areas covered by respective Fields Of View (FOVs) of the video cameras. The at least one processor is also configured to detect and recognize at least one of an object accessory and a non-permanent object facet possessed by an object-of-interest within at least one reference image. The at least one processor is also configured to compare the semantic metadata to additional metadata corresponding to the at least one of the object accessory and the non-permanent object facet to identify a subset of the video cameras, less than the entire video camera universe, that meet a similarity score condition. The at least one processor is also configured to create or modify, after the subset of the video cameras is identified, an analytics criteria or analytics prioritization to be applied to the subset of the video cameras.

Each of the above-mentioned embodiments will be discussed in more detail below, starting with example system and device architectures of the system in which the embodiments may be practiced, followed by an illustration of processing blocks for achieving an improved technical method, device, and system for profiling a reference image and an object-of-interest therewithin.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, scanner, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Regarding the video review application 144, this can be run on the computer terminal 104 and may include a search User Interface (UI) module which, amongst other things, may optionally include an interactive maps submodule configured to allow a user to selectively view one or more security cameras within a visual map of a geographical area. The UI module may also be cooperatively coupled with a search session manager module in order to enable a computer terminal user to carry out actions related to providing input in relation images, live video and video recordings (such as, for example, input to facilitate carrying out one or more appearance searches). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video (and respective metadata) in support of, for example, client-side video review, video export, managing event detection, etc. In this regard, the query manager module is communicatively coupled to one or more data stores 190 (described later herein in more detail) and an appearance search module 192 that supports appearance searches.

Still with reference to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_n$ in the security system 100. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Also, those skilled in the art will appreciate that, in some instances, the video analytics engine may be programmed with a detection classifier that evaluates a received video stream (for example, an image or part of an image of the video stream captured by one of the camera devices $103_1$-$103_n$) to determine if an instance of an object of interest that is defined in the detection classifier is detected or not from the evaluated video stream. Other suitable implementation alternatives, apparent to those skilled in the art, are also contemplated.

The server system 108 also includes a similarity scoring engine 175 (explained later herein in more detail), and a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, other sensor data, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc. In some examples, a lexical database may be included amongst the databases 191, and various semantic metadata may be stored in one of the databases 191 (the purpose of having a lexical database and storing semantic metadata will be described in more detail later herein).

Optionally, the security system 100 may include connections to the illustrated one or more cloud services 195. For example, the computer terminal 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). The cloud service(s) 195 which may, amongst other things, include neural network(s), and may include functionality similar and/or complementary to functionality provided by the server system 108. In some examples, the cloud service(s) 195 may support multi-site appearance search where the cloud service(s) 195 is communicatively coupled to a plurality of the server systems 108 to run a coordinated appearance search across a plurality of security sites each with their respective server system 108.

The illustrated security system 100 includes a plurality of camera devices $103_1$-$103_n$ (hereinafter interchangeably referred to as "cameras $103_1$-$103_n$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

The camera 103 includes an image sensor 109 (corresponding to one of the sensors $109_1$-$109_N$ shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113 (corresponding to one of the processors $113_1$-$113_N$ shown in FIG. 1), one or more video analytics modules 119 (corresponding to one of the video analytics modules $119_1$-$119_N$ shown in FIG. 1), and one or more memory devices 115 (corresponding to one of the memories $115_1$-$115_N$ shown in FIG. 1) coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103-103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system 100 illustrated in FIG. 1 only explicitly shows video sensor devices coupled to the server system 108, it will be understood that the security system 100 is not limited in contemplated compositions to just video sensor devices. Some examples of the security system 100 include a heterogeneous mixture of both video sensor devices and non-video sensor devices coupled to the server system 108. One type of non-video sensor device is a radar-based sensor device such as, for example, the Avigilon Presence Detector (APD)™ sold by Avigilon Corporation.

Figure 2:
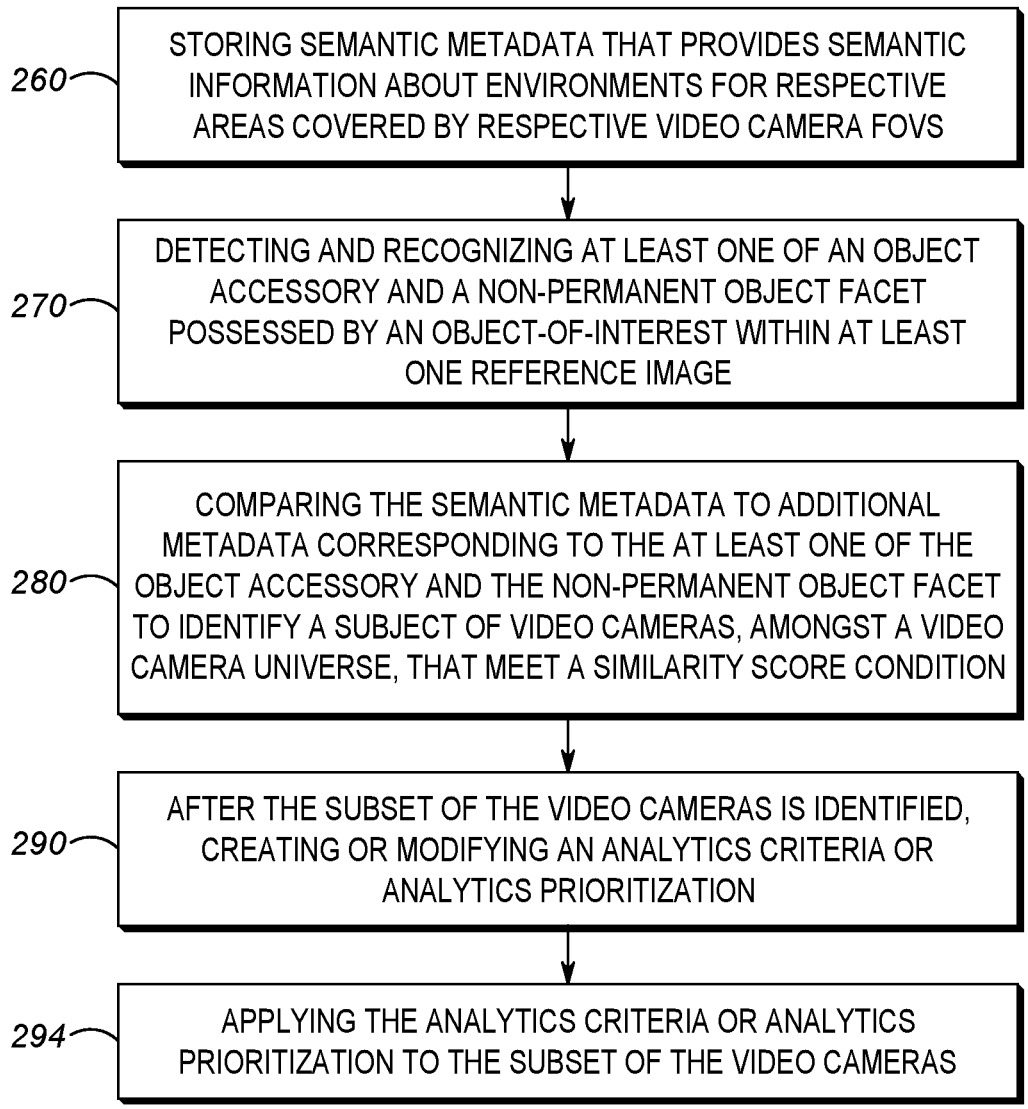
FIG. 2 is a flow chart illustrating a computer-implemented method in accordance with an example embodiment.
Figure 3:
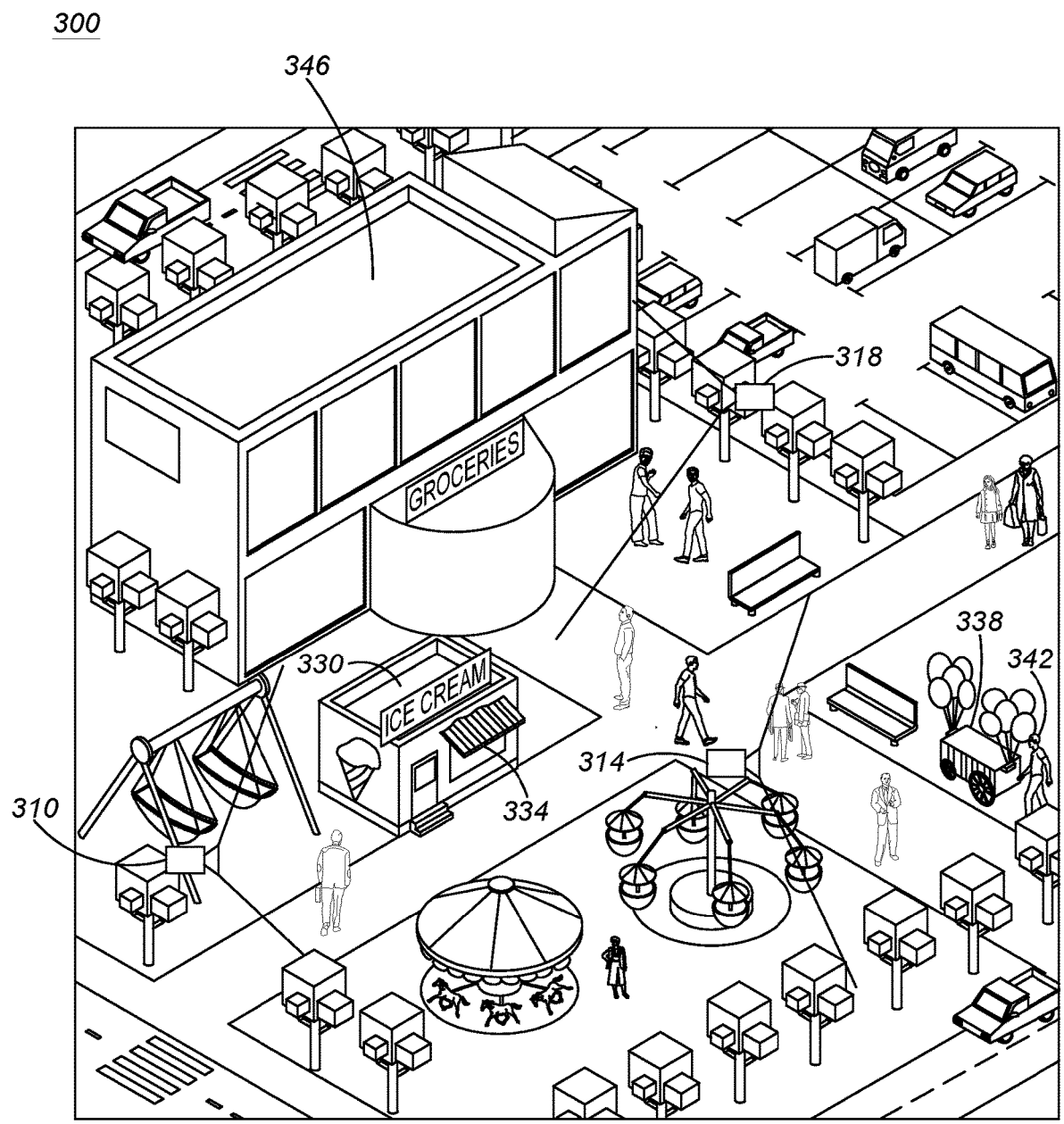
FIG. 3 is a diagram illustrating an example outdoor area, within which a number of camera devices have been installed, and belonging to, a security system which may be configured to operate in accordance with the example embodiment of FIG. 2.

Reference is now made to FIGS. 2-6. FIG. 2 is a flow chart illustrating a computer-implemented method 250 in accordance with an example embodiment. Firstly, in the method 250, semantic metadata is stored (260). For example, semantic metadata may be stored in the data store 190 (FIG. 1) or in cloud storage 199 accessible to the cloud service(s) 195. The semantic metadata is: i) in relation to a plurality of video cameras (for example, the camera devices $103_1$-$103_n$ previously described) within a video camera universe; and ii) providing semantic information about environments for respective areas covered by respective video camera Fields Of View (FOVs) of the video cameras (for example, the camera devices $103_1$-$103_n$ previously described). In some examples, the semantic metadata is generated by taking images and/or video captured over time by a particular video camera, and applying an object detection/segmentation model to these images and/or video.

Regarding the semantic information about environments mentioned above, FIG. 3 is illustrative in understanding example types of semantic information. In particular, within illustrated example geographic area 300 (which in the illustrated example is an outdoor area) there are video cameras including video cameras 310, 314 and 318 (each of which may correspond to a respective one of the cameras $103_1$-$103_n$ described previously) and having different environments for the areas covered by the FOVs of the cameras 310, 314 and 318. The video camera 310 shown in FIG. 3 covers activity around an ice cream store 330 (for instance, during stores hours people obtain ice cream cones and other ice cream desserts via a store counter 334). The video camera 314 shown in FIG. 3 covers activity around a balloon cart 338 (for instance, when manned for operation people obtain balloons by approaching and transacting with person 342 working at the balloon cart 338). The video camera 318 shown in FIG. 3 covers activity around a grocery store 346 (for instance, when the grocery store 346 is open people may exit therefrom carrying grocery bags).

Continuing on to a next action in the method 250 of FIG. 2, at least one of an object accessory and a non-permanent object facet possessed by an object-of-interest, within at least one reference image, is detected and recognized (270). For instance, take the example of a security guard in possession of a reference image 400 (FIG. 4) of a child 410 that a parent is trying to locate. In such an example situation, a video security system may be tasked to receive the reference image 400 as input (for example, the reference image 400 may be scanned in from a photo via one of the input devices 114, or alternatively obtained from recorded video stored in the data store 190). Furthermore, and prior to running the appearance search to be carried out in part by the appearance search module 192, detection and and recognition an object accessory (i.e. an ice cream cone 420 in the hand of the child 410) within the reference image 400 is carried out by a suitable analytics module or other means provided within the video security system.

Next in the method 250, the semantic metadata is compared (280) to additional metadata corresponding to the at least one of the object accessory and the non-permanent object facet to identify a subset of the video cameras, less than the entire video camera universe, that meet a similarity score condition (or relatedness score condition). So, with reference again to the example of the child 410, there will be a universe of video cameras for the appearance search to be applied to; however some video cameras may meet the similarity score condition, while others may not. For instance, the video camera 310 may be scored at or higher than the similarity score condition in view of the ice cream store 330 being within the FOV of the video camera 310. By contrast, a less relevant video camera, such as for instance the video camera 314, may be scored below the similarity score condition. Thus, for the above-mentioned example, the video camera 310 would be identified as part of the subset of the video cameras, whereas the video camera 314 would not be identified as part of the subset of the video cameras. In some examples, the action 280 is carried out by the similarity scoring engine 175 (previously herein mentioned).

Also, it will be understood that relatedness can be specified as user defined rules or similarity using a lexical database (i.e. lexical database that was previously herein mentioned). An example of a lexical database is WordNet (a dictionary for the English language, specifically designed for natural language processing). For instance, Wu-Palmer similarity based on WordNet calculates: i) similarity('playground', 'dog')=0.375<similarity('playground', 'skateboard')=0.4; and ii) similarity('Nike™', 'playground')= 0.118>similarity('Nike™' 'park')=0.111 (note: the "TM" part of "Nike™" is only for formality purposes of the present document, but for actual implementation purposes it is not included).

In some examples, the user can work collaboratively with the computer application to tweak or improve word choice for the object accessory (or non-permanent object facet). For instance, the computer application may display what the computer believes is the word for the particular object accessory (or non-permanent object facet), and if the user believes it is not a sufficiently good choice the user can input a different word by manipulating an appropriate one or more of the input device 114.

Figure 4:
FIG. 4 is showing an example reference image, within which a child is holding an ice cream cone.
Figure 5:
FIG. 5 is showing another example reference image, within which a woman is carrying a bag of groceries.

Also, it will be understood that other examples of object accessories and non-permanent object facets besides the example illustrated in FIG. 4 are contemplated. For instance, reference image 500 and reference image 600 in FIGS. 5 and 6 respectively illustrate additional examples. In the reference image 500, there is shown a woman 510 whom with respect to which a bag of groceries, which she is carrying, may be detected and recognized (i.e. the bag of groceries 520 is a different type of object accessory than the ice cream 420). Going back to the example of an appearance search, if the reference image 500 were being used as initial input instead of the reference image it may be expected that the inclusion/exclusion of the video cameras within the prioritized subset of video cameras would be the opposite of what was described previously.

Figure 6:
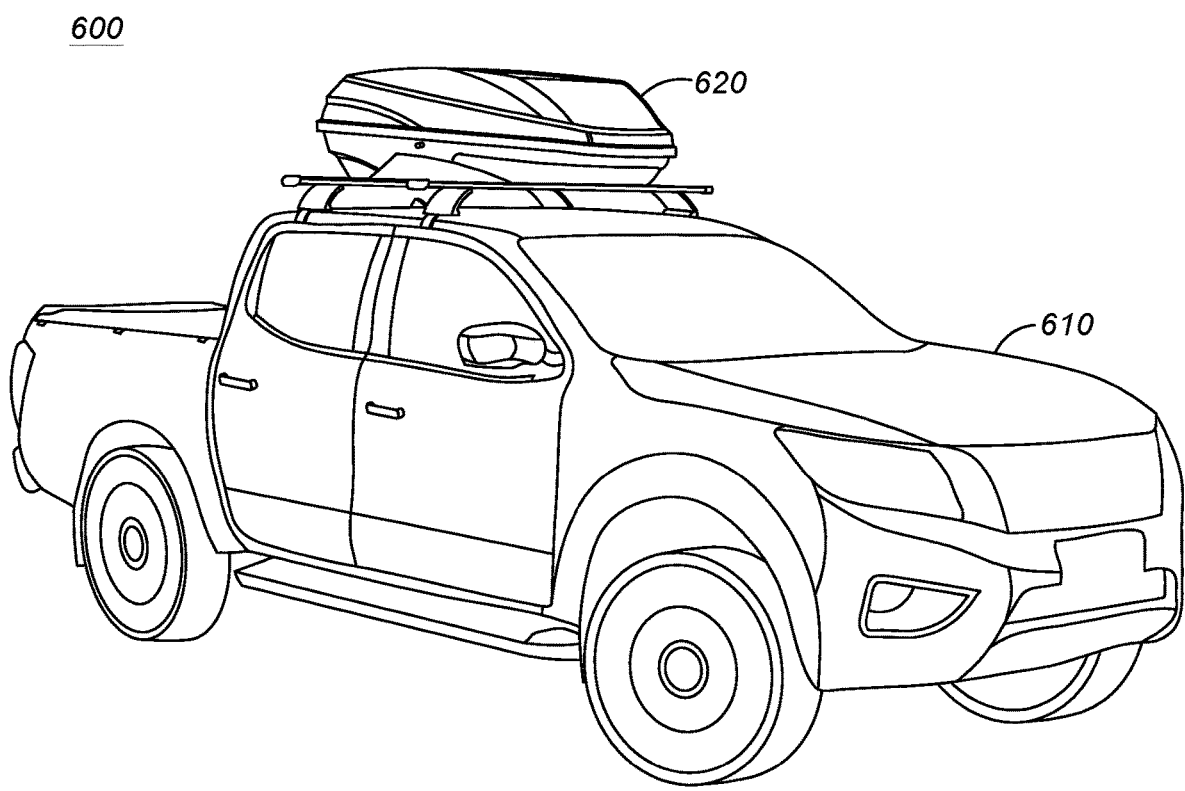
FIG. 6 is showing an yet another example reference image, within which a ski storage container is attached on a roof of a pickup truck.

FIG. 6 illustrates an example of a reference image 600 within which there is different type of object (i.e. a pickup truck 610). Here a non-permanent object facet for the pickup truck 610 is ski storage container 620, so for this example video cameras proximate to ski hills/mountains may be the type of video camera that score high in similarity in relation to the reference image 600. A non-exhaustive list of other examples of object accessories and non-permanent object facets follows: articles of clothing, signage affixed or stuck to the objects-of-interest, substances or materials temporarily coating portions of surfaces or outer layers of objects-of-interest, containers or bags carried or towed by objects-of-interest, and object accessories attached or secured to objects-of-interest.

Referring once again to FIG. 2, after the subset of the video cameras is identified, next in the method 250 an analytics criteria or analytics prioritization is created or modified (290). For instance, referring again to the example of the appearance search conducted for the child 410, an analytics prioritization is created: the appearance search will first search video cameras of the subset of video cameras which includes the video camera 310, and then only later search other video cameras which do not belong to the subset of video cameras which were identified for search prioritization. For instance, in some examples all video cameras in the video camera universe may eventually be searched; however in some alternative examples whether and to what extent to search other video cameras not belonging to the identified subset of the video cameras may depend on how successful the prioritized part of the appearance search was at obtaining confirmed match results.

Also, it will be understood that, in some examples, the video camera universe may span across multiple video security sites and that so-called multi-site appearance search is contemplated for such examples. Furthermore, in such examples parts or all of one video security site may be prioritized for appearance searching over parts or all of a different video security site.

Finally (and still with reference to the method 250 of FIG. 2) the above-described analytics criteria or analytics prioritization is applied (294) to the subset of the video cameras. So in the context of the appearance search conducted for the child 410, the appearance search module 192 will first query for metadata initially limited to video cameras of the subset of metadata to try and find matching additional images of the child 410. Also, in the case of appearance searching, other information in relation to the reference image may impact search prioritizing as well. For example, if the reference image includes a time stamp, then depending on the type of the object accessory (or non-permanent object facet), prioritizing a particular time period within which to search may be appropriate (for instance, backwards in time searching in the case of the ice cream cone 420 under the assumption that the child 410 would be traveling away from and not towards an ice cream store and, by contrast, perhaps agnostic to such time consideration in the case of the ski storage container 620 since there may be no way to tell whether the pickup truck 610 was going towards or away from a ski hill/mountain).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot control or manage comparisons of metadata to effect analytics changes on particular video cameras, among other features and functions set forth herein).

In the foregoing specification, specific embodiments have been described. However, one of ordinary skill in the art appreciates that various modifications and changes can be made without departing from the scope of the invention as set forth in the claims below. For example, the sematic metadata that serves to profile a particular video camera can be generated based not only on background objects, but also on moving foreground objects (for instance, a "dog-friendly park" may be distinguished from some other park based on repeated appearance of dogs with that particular park over time). As another example, example embodiments are not limited to appearance searching, and can alternatively relate to other analytics applications such as, for instance, taking an action for additional verification of an initial classification of an object-of-interest based on a determination that the initial classification is inconsistent with certain sematic metadata corresponding to a particular video camera. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
   in relation to a plurality of video cameras within a video camera universe, storing semantic metadata that provides semantic information about environments for respective areas covered by respective Fields Of View (FOVs) of the video cameras;
   detecting and recognizing at least one of an object accessory and a non-permanent object facet possessed by an object-of-interest within at least one reference image;
   comparing the semantic metadata to additional metadata corresponding to the at least one of the object accessory and the non-permanent object facet to:
      generate a similarity score as a part of the comparing, and
      identify a subset of the video cameras, less than the entire video camera universe, that meet a similarity score condition;
   after the subset of the video cameras is identified, creating or modifying an analytics criteria or analytics prioritization to be applied to the subset of the video cameras; and
   carrying out an appearance search directed to the object-of-interest within the at least one reference image,
   wherein the appearance search prioritizes at least one time search period based on a traveling relationship determined from all of:
      at least one time stamp of the respective at least one reference image,
      a portion of the semantic information corresponding to one or more of less than all of the respective areas, and
      the additional metadata corresponding to the at least one of the object accessory and the non-permanent object facet.

2. The computer-implemented method as claimed in claim 1 wherein the analytics criteria is a video image search criteria, and the analytics prioritization is a video image search prioritization.

3. The computer-implemented method as claimed in claim 2 wherein the appearance search is defined in part by the video image search criteria and the video image search prioritization.

4. The computer-implemented method as claimed in claim 2 wherein:
   the video camera universe spans across a plurality of video security sites,
   at least one of the video cameras in one of the video security sites is communicatively coupled to a server via at least one network, and
   another at least one of the video cameras in a different one of the video security sites is also coupled to the server.

5. The computer-implemented method as claimed in claim 4
   wherein the creating or modifying the video image search criteria or the video image search prioritization includes assigning a higher priority to search computations in respect of the one of the video security sites than search computations in respect of the different one of the video security sites.

6. The computer-implemented method as claimed in claim 1 wherein the creating or modifying the analytics criteria or analytics prioritization comprises modifying an alert-triggering watchlist applied to the subset of the video cameras.

7. The computer-implemented method as claimed in claim 1 wherein the at least one of the object accessory and the non-permanent object facet includes at least one of an article of clothing, signage affixed or stuck to the object-of-interest, and a substance or material temporarily coating portions of a surface or outer layer of the object-of-interest.

8. The computer-implemented method as claimed in claim 1 wherein the at least one of the object accessory and the non-permanent object facet includes at least one of a container or bag carried or towed by the object-of-interest, and an object accessory attached or secured to the object-of-interest.

9. The computer-implemented method as claimed in claim 1 further comprising:
   detecting an unidentified object in video frames captured by a video security camera amongst the subset of the video cameras;
   determining that an initial classification of the unidentified object is inconsistent with a portion of semantic metadata corresponding to the video security camera; and
   carrying out additional verification to cause the initial classification to be confirmed or rejected.

10. The computer-implemented method as claimed in claim 1 wherein generating of the similarity score includes querying a lexical database.

11. A system comprising:
    a plurality of video cameras belonging to a video camera universe; and
    at least one processor communicatively coupled to the video cameras and configured to:
       communicatively operate within the system to effect storage of semantic metadata in relation to the video cameras, the semantic metadata providing semantic information about environments for respective areas covered by respective Fields Of View (FOVs) of the video cameras;
       detect and recognize at least one of an object accessory and a non-permanent object facet possessed by an object-of-interest within at least one reference image;
       compare the semantic metadata to additional metadata corresponding to the at least one of the object accessory and the non-permanent object facet to:
          generate a similarity score as a part of the comparing, and
          identify a subset of the video cameras, less than the entire video camera universe, that meet a similarity score condition;
       after the subset of the video cameras is identified, create or modify an analytics criteria or analytics prioritization to be applied to the subset of the video cameras; and
       carry out an appearance search directed to the object-of-interest within the at least one reference image,
       wherein the appearance search prioritizes at least one time search period based on a traveling relationship determined from all of:
          at least one time stamp of the respective at least one reference image, a portion of the semantic information corresponding to one or more of less than all of the respective areas, and the additional metadata corresponding to the at least one of the object accessory and the non-permanent object facet.

12. The system as claimed in claim 11 wherein the analytics criteria is a video image search criteria, and the analytics prioritization is a video image search prioritization.

13. The system as claimed in claim 12 wherein
the appearance search is defined in part by the video image search criteria and the video image search prioritization.

14. The system as claimed in claim 12 wherein:
the video camera universe spans across a plurality of video security sites, and further comprising:
a server that is communicatively coupled to:
  i) at least one of the video cameras in one of the video security sites via at least one network; and
  ii) another at least one of the video cameras in a different one of the video security sites.

15. The system as claimed in claim 14 wherein
the at least one processor is further configured to:
  assign, as a part of creating or modifying the video image search criteria or the video image search prioritization, a higher priority to search computations in respect of the one of the video security sites than search computations in respect of the different one of the video security sites.

16. The system as claimed in claim 11 wherein the at least one processor is further configured to: modify, as a part of creating or modifying the analytics criteria or the analytics prioritization, an alert-triggering watchlist applied to the subset of the video cameras.

17. The system as claimed in claim 11 wherein the at least one of the object accessory and the non-permanent object facet includes at least one of an article of clothing, signage affixed or stuck to the object-of-interest, and a substance or material temporarily coating portions of a surface or outer layer of the object-of-interest.

18. The system as claimed in claim 11 wherein the at least one of the object accessory and the non-permanent object facet includes at least one of a container or bag carried or towed by the object-of-interest, and an object accessory attached or secured to the object-of-interest.

19. The system as claimed in claim 11 wherein the at least one processor is further configured to:
  detect an unidentified object in video frames captured by a video security camera amongst the subset of the video cameras,
  determine that an initial classification of the unidentified object is inconsistent with a portion of semantic metadata corresponding to the video security camera, and
  carry out additional verification to cause the initial classification to be confirmed or rejected.

20. The system as claimed in claim 11 wherein:
the at least one processor is further configured to query a lexical database when the similarity score is generated.

* * * * *